(12) United States Patent
Ahn et al.

(10) Patent No.: US 8,015,342 B2
(45) Date of Patent: Sep. 6, 2011

(54) METHOD OF MANAGING AND RESTORING IDENTIFIER OF STORAGE DEVICE AND APPARATUS THEREFOR

(75) Inventors: Chang-sup Ahn, Seoul (KR); Yong-kuk You, Seoul (KR); So-young Lee, Suwon-si (KR); Bong-seon Kim, Seongnam-si (KR); Ji-young Moon, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 769 days.

(21) Appl. No.: 12/120,540

(22) Filed: May 14, 2008

(65) Prior Publication Data
US 2009/0037642 A1 Feb. 5, 2009

Related U.S. Application Data

(60) Provisional application No. 60/952,904, filed on Jul. 31, 2007.

(30) Foreign Application Priority Data

Oct. 8, 2007 (KR) ........................ 10-2007-0100859

(51) Int. Cl.
*G06F 12/00* (2006.01)

(52) U.S. Cl. ....................................................... 711/100
(58) Field of Classification Search .................... None
See application file for complete search history.

(56) References Cited

U.S. PATENT DOCUMENTS

| | | | | |
|---|---|---|---|---|
| 6,622,143 B1* | 9/2003 | Okada et al. | ................... | 709/203 |
| 7,277,995 B2* | 10/2007 | Davies et al. | ................. | 711/154 |
| 7,779,093 B1* | 8/2010 | Zhang et al. | ..................... | 709/221 |
| 2004/0024867 A1* | 2/2004 | Kjellberg | ....................... | 709/224 |
| 2005/0128526 A1* | 6/2005 | Kaltenecker et al. | ......... | 358/400 |

FOREIGN PATENT DOCUMENTS

| | | |
|---|---|---|
| JP | 2004-070875 A | 3/2004 |
| KR | 10-2001-0006888 A | 1/2001 |

* cited by examiner

*Primary Examiner* — Hiep T Nguyen
(74) *Attorney, Agent, or Firm* — Sughrue Mion, PLLC (57) ABSTRACT

A method of managing and restoring an identifier of a storage device and an apparatus therefor are provided. The method includes the operations of generating a storage device identifier; recording the storage device identifier in a non-volatile memory of a host; generating an identifier file including the storage device identifier and a host identifier; and recording the identifier file in the storage device. By doing so, the method and apparatus can efficiently and securely manage the storage device.

19 Claims, 8 Drawing Sheets

METHOD OF MANAGING AND RESTORING IDENTIFIER OF STORAGE DEVICE AND APPARATUS THEREFOR

CROSS-REFERENCE TO RELATED PATENT APPLICATION

This application claims the benefit of U.S. Provisional Patent Application No. 60/952,904, filed on Jul. 31, 2007, in the U.S. Patent and Trademark Office, and the benefit of Korean Patent Application No. 10-2007-0100859, filed on Oct. 8, 2007, in the Korean Intellectual Property Office, the disclosures of which are incorporated herein their entirety by reference.

BACKGROUND OF THE INVENTION

1. Field of the Invention

The methods and apparatuses consistent with the present invention relate to the management and restoration of an identifier of a storage device, and more particularly, to methods and apparatuses for the management and restoration of an identifier of a storage device for utilization in securely managing the storage device in terms of digital content access controls such as Digital Rights Management (DRM).

2. Description of the Related Art

Recently, the rate of supply of digital contents has increased rapidly, and thus, digital contents are often stored or reproduced in various storage and reproducing apparatuses. As non-intelligent storage devices, that is, devices which do not have a calculation function for storing digital contents, general-use storage devices such as a Hard Disk Drive (HDD), a flash memory, and the like are often used. However, such general-use storage devices cannot provide a unique identifier for each storage device, wherein the unique identifier is requested by an access control system, such as DRM.

Figure 1:
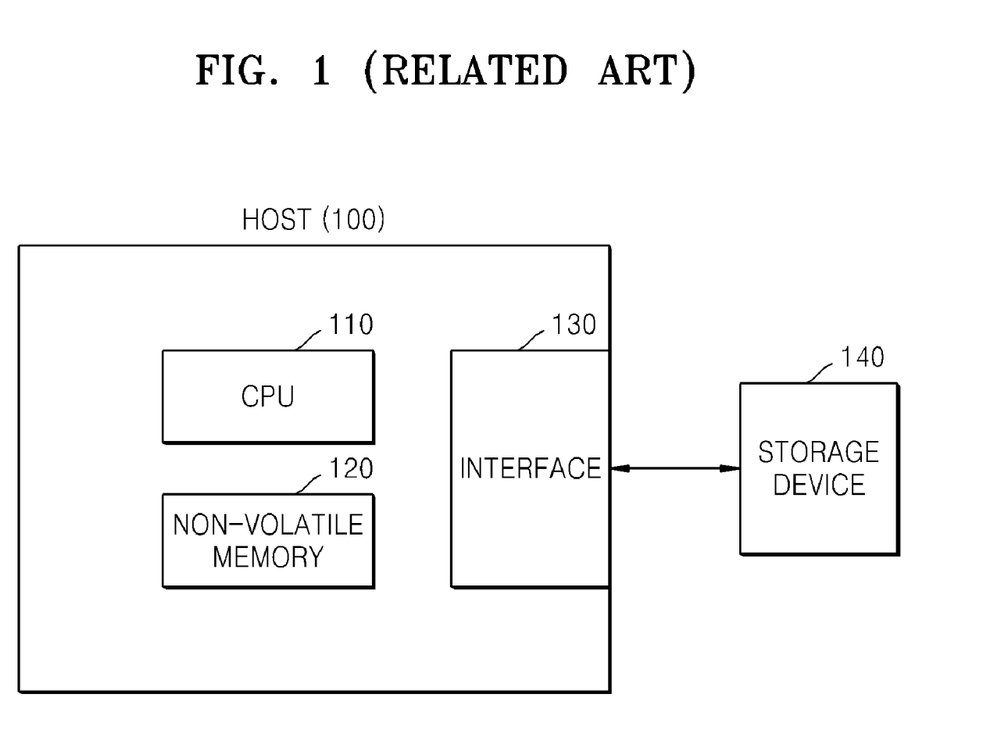
FIG. 1 is a block diagram illustrating a conventional configuration of a host, and a connection relationship between the host and a storage device.

FIG. 1 is a block diagram illustrating a conventional configuration of a host 100, and a connection relationship between the host 100 and a storage device 140.

Referring to FIG. 1, the host 100 includes a Central Processing Unit (CPU) 110, a non-volatile memory 120, and an interface 130. The host 100 may be, for example, a cable set-top box or a personal video recorder (PVR)/digital video recorder (DVR) apparatus.

The storage device 140 is connected with the host 100 via the interface 130. For example, in the case of a HDD, the host 100 can obtain a physical unique identifier for the HDD via an Integrated Drive Electronics (IDE) interface or the like.

However, such an obtained identifier has a form that varies according to manufacturer, and is not reliable enough to be used in a business model such as a DRM system or the like. Also, flash memory such as Compact Flash (CF) memory or Secure Digital (SD) memory do not have reliable unique identifiers. Thus, a reliable unique identifier which can satisfy security requirements for encryption has to be used in non-intelligent general-use storage devices.

SUMMARY OF THE INVENTION

The present invention provides a method of managing and restoring an identifier of a storage device performed by a host and an apparatus therefor which can efficiently and securely manage the storage device.

According to an aspect of the present invention, there is provided a method of managing an identifier of a storage device, performed by a host, the method including the operations of generating a storage device identifier; recording the storage device identifier in a non-volatile memory of the host which has generated the storage device identifier; generating an identifier file comprising the storage device identifier and a host identifier of the host; and recording the identifier file in the storage device.

The method may further include the operations of generating metadata of contents input to or stored in the host; and recording the contents and the metadata in the storage device, wherein the metadata comprises the storage device identifier and the host identifier.

In the operation of generating the identifier file, the identifier file may be generated so as to further comprise a verifier for performing an integrity check of the identifier file.

The integrity check of the identifier file may be performed by using one of an electronic signature method, a Message Authentication Codes (MAC) method, and a hash function method.

A file name of the identifier file may be derived from the host identifier.

According to another aspect of the present invention, there is provided a method of managing an identifier of a storage device, performed by a host, the method including the operations of generating a storage device identifier; and recording the storage device identifier and a host identifier of the host in the storage device, wherein the host has generated the storage device identifier.

According to another aspect of the present invention, there is provided a method of restoring an identifier of a storage device, performed by a host, the method including the operations of scanning a first identifier file stored in the storage device; performing a first comparison of a first storage device identifier and a first host identifier which are included in the first identifier file with a second storage device identifier and a second host identifier which are stored in a non-volatile memory of the host; selectively scanning metadata related to contents stored in the storage device, based on a result of the first comparison; performing a second comparison of a third storage device identifier and a third host identifier which are included in the metadata with the second storage device identifier and the second host identifier; generating a second identifier file by selectively using the third storage device identifier and the third host identifier, based on a result of the second comparison; and recording the second identifier file in the storage device.

The operation of second comparison may include the operation of repeatedly comparing a fourth storage device identifier and a fourth host identifier which are included in another metadata stored in the storage device with the second storage device identifier and the second host identifier, and wherein the generating of the second identifier file comprises generating the second identifier file with one selected from the third storage device identifier and the fourth storage device identifier on the basis of at least one of a scanning order, an external input, and a magnitude.

According to another aspect of the present invention, there is provided an identifier management apparatus related to a storage device, the identifier management apparatus including an identifier generation unit generating a storage device identifier; an identifier recording unit recording the storage device identifier in a non-volatile memory of a host which has generated the storage device identifier; a file generation unit generating an identifier file comprising the storage device identifier and a host identifier of the host; and an interface unit for recording the identifier file in the storage device.

According to another aspect of the present invention, there is provided an identifier restoration apparatus related to a storage device, the identifier restoration apparatus including a file scan unit scanning a first identifier file stored in the storage device; a first comparison unit performing a first comparison of a first storage device identifier and a first host identifier which are included in the first identifier file with a second storage device identifier and a second host identifier which are stored in a non-volatile memory of a host; a metadata scan unit selectively scanning metadata related to contents stored in the storage device, based on a result of the first comparison; a second comparison unit performing a second comparison of a third storage device identifier and a third host identifier which are included in the metadata with the second storage device identifier and the second host identifier; and a file generation unit generating a second identifier file by selectively using the third storage device identifier and the third host identifier, based on a result of the second comparison, and recording the second identifier file in the storage device.

According to another aspect of the present invention, there is provided a computer readable recording medium having recorded thereon a program for executing a method of managing an identifier of a storage device, performed by a host, the method including the operations of generating a storage device identifier; recording the storage device identifier in a non-volatile memory of the host which has generated the storage device identifier; generating an identifier file comprising the storage device identifier and a host identifier of the host; and recording the identifier file in the storage device.

According to another aspect of the present invention, there is provided a computer readable recording medium having recorded thereon a program for executing a method of restoring an identifier of a storage device, the method including the operations of scanning a first identifier file stored in the storage device; performing a first comparison of a first storage device identifier and a first host identifier which are included in the first identifier file with a second storage device identifier and a second host identifier which are stored in a non-volatile memory of a host; selectively scanning metadata related to contents stored in the storage device, based on a result of the first comparison; performing a second comparison of a third storage device identifier and a third host identifier which are included in the metadata with the second storage device identifier and the second host identifier; generating a second identifier file by selectively using the third storage device identifier and the third host identifier, based on a result of the second comparison; and recording the second identifier file in the storage device.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 2:
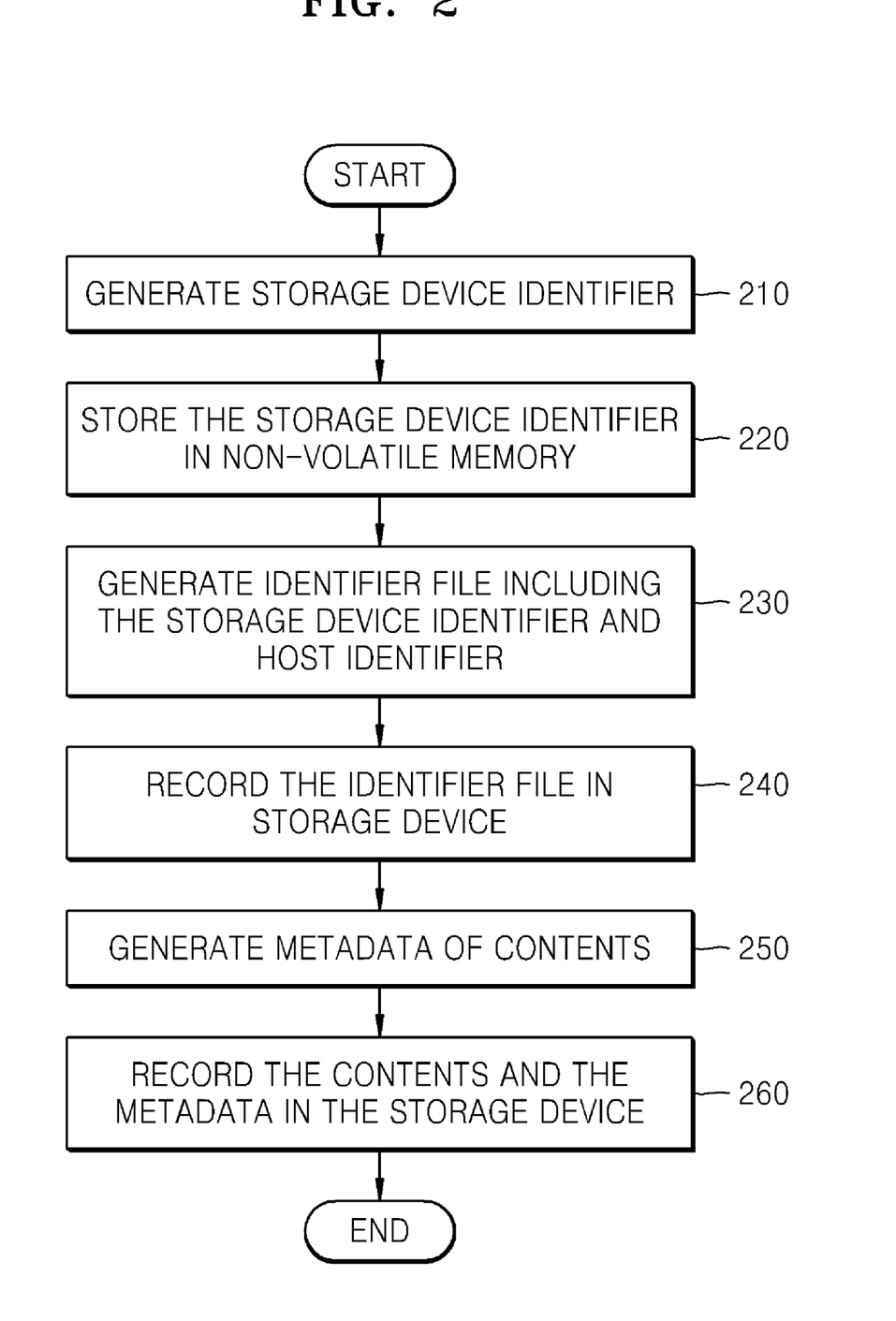
FIG. 2 is a flowchart illustrating a method of managing an identifier of a storage device performed by a host according to an embodiment of the present invention.

FIG. 2 is a flowchart illustrating a method of managing an identifier of a storage device performed by a host according to an embodiment of the present invention.

Referring to FIG. 2, in operation 210, the host generates a virtual storage device identifier that is related to the storage device connected with the host. The storage device identifier is generated to be a unique value in the corresponding host. When the host generates the storage device identifier, only the host may recognize the storage device by using the generated storage device identifier. Thus, the storage device identifier is valid only in the storage device and the host which has generated the storage device identifier.

Figure 5A:
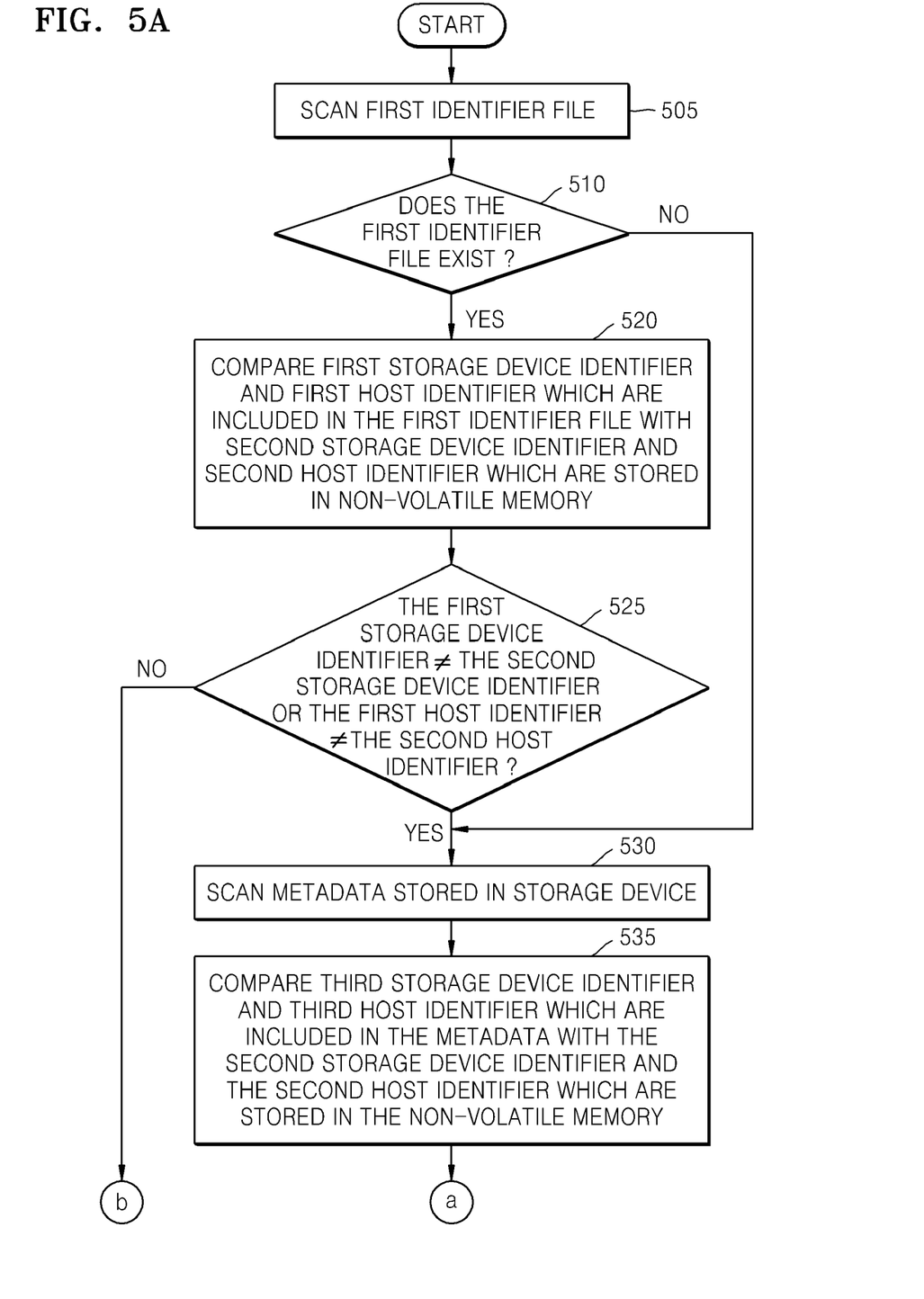
FIGS. 5A and 5B are flowcharts illustrating a method of restoring an identifier of a storage device as performed by a host according to another embodiment of the present invention.

In operation 220, the storage device identifier is recorded in a non-volatile memory of the host which has generated the storage device identifier. However, according to embodiments, operation 220 may be executed after operation 230 or operation 240. The reason for recording the storage device identifier in the non-volatile memory is that an identifier file recorded in the non-volatile memory is used in a procedure for restoring an identifier file when the identifier file recorded in the storage device is damaged. The procedure for restoring the identifier file will be described later with reference to FIG. 5.

In operation 230, the host generates an identifier file including the storage device identifier and a host identifier. The identifier file will now be described with reference to FIG. 3.

Figure 3:
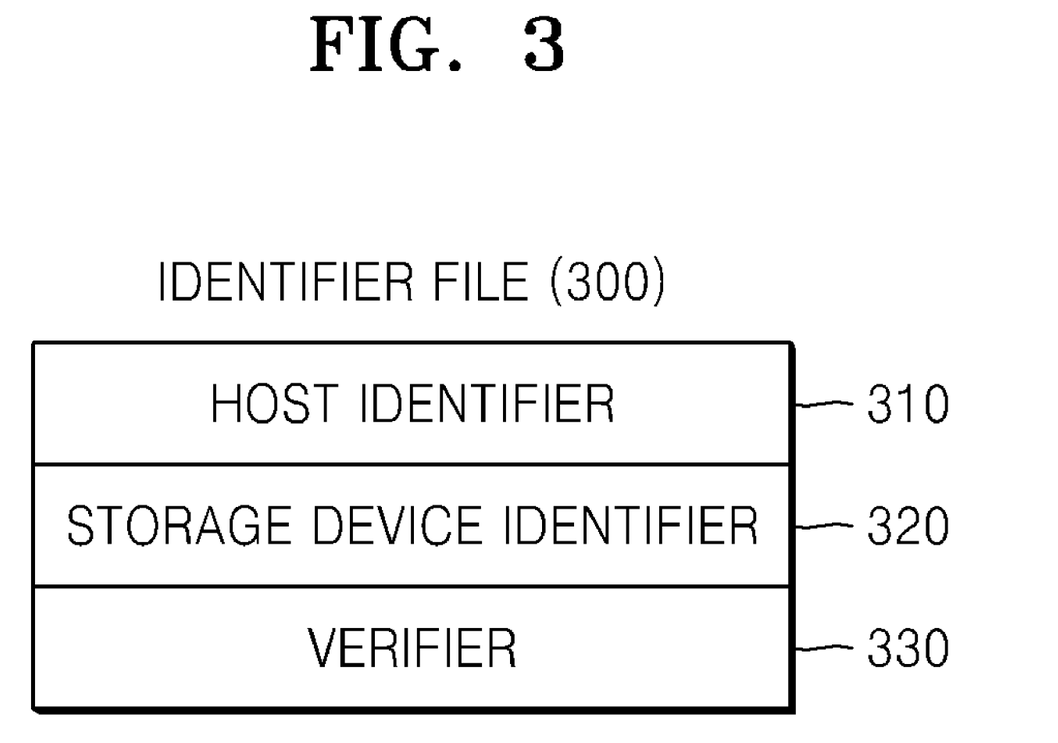
FIG. 3 is a diagram illustrating an example of an identifier file related to a storage device, according to the present invention.

FIG. 3 is a diagram illustrating an example of an identifier file 300 related to a storage device, according to the present invention.

Referring to FIG. 3, the identifier file 300 includes a host identifier 310 and a storage device identifier 320. Also, the identifier file 300 may further include a verifier 330 for performing an integrity check of the identifier file 300.

The host identifier 310 is an identification number for differentiating a plurality of hosts. The host identifier 310 is provided to all hosts at manufacture and is stored in a non-volatile memory such as a Read Only Memory (ROM).

The storage device identifier 320 is generated by a host connected with the storage device and has a unique value for each storage device.

The verifier 330 is used to perform the integrity check of the identifier file 300. The integrity check of the identifier file 300 may be performed by using an electronic signature method, a MAC method, a hash function method, etc. When the host uses the identifier file 300, the host always has to first check the verifier 330. When the verifier 330 is invalid, the host discontinues the process.

A file name of the identifier file 300 may be derived from a host identifier of the host which has generated the identifier file 300. For example, the file name of the identifier file 300 may be a string value obtained by performing hex encoding or base 64 encoding on the host identifier 310. Otherwise, the file name of the identifier file 300 may be generated by using a hash function. The reason for deriving the file name of the identifier file 300 from the host identifier of the host which has generated the identifier file 300 is that a single storage device may be connected with a plurality of hosts. That is, it is necessary to prevent an overlap of the same file names due to the plurality of hosts.

Referring back to FIG. 2, in operation 240, the host may record the identifier file, which is generated in operation 230, in the storage device, and may end a process. The identifier file is stored in a predetermined position of the storage device.

Also, according to another embodiment, in operation 250, the host generates metadata related to digital contents that are input to or stored in the host. Here, the metadata includes the storage device identifier and the host identifier.

In operation 260, the digital contents and the metadata are stored in the storage device.

Also, in a modified embodiment, the host may record a storage device identifier and a host identifier in the storage device, instead of recording the identifier file. In such a case, the host may generate the storage device identifier, and may record the storage device identifier and the host identifier of the host, which has generated the storage device identifier, in the storage device.

Figure 4:
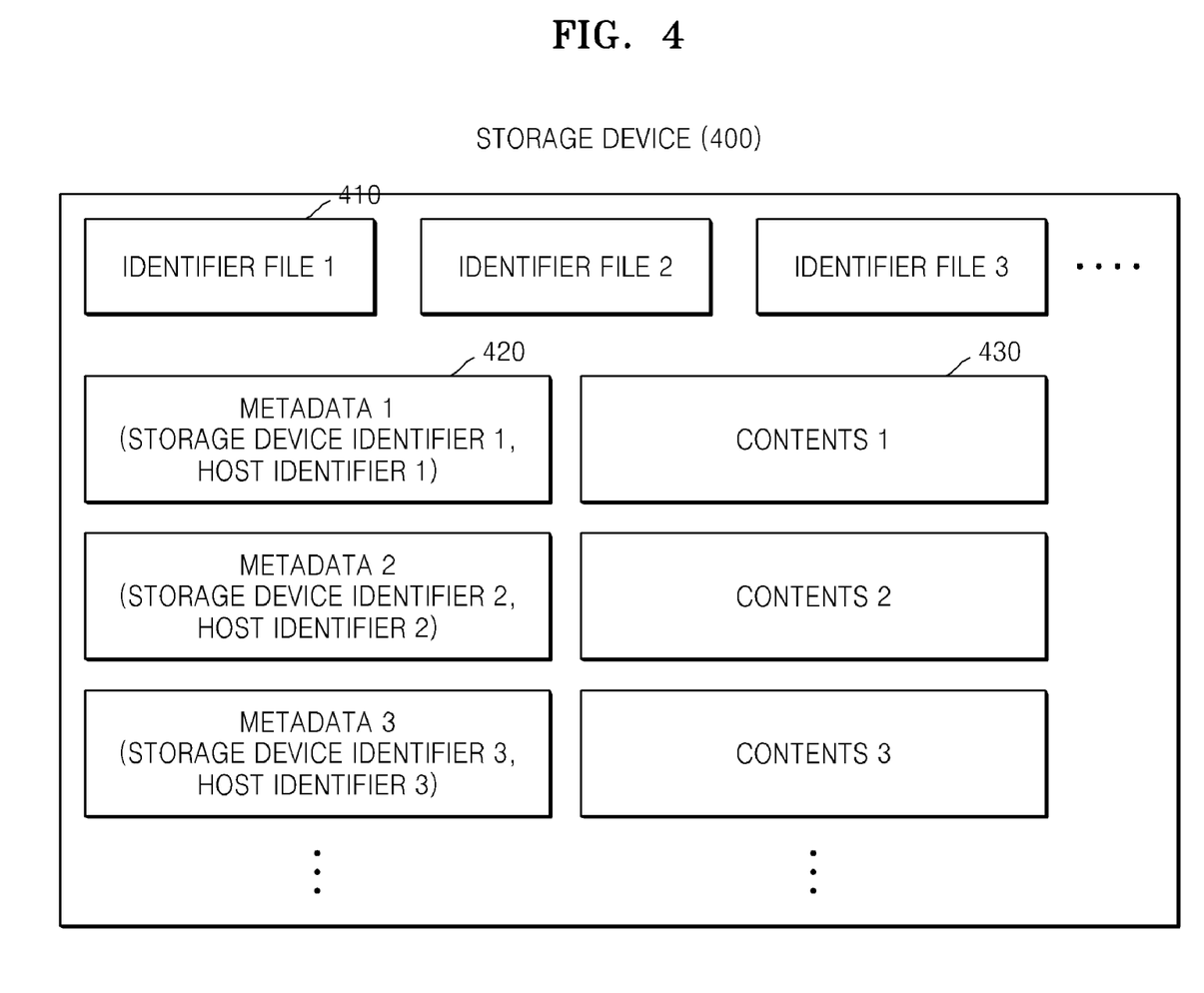
FIG. 4 is a diagram illustrating an example of a storage device storing an identifier file, according to the embodiment of FIG. 2.

FIG. 4 is a diagram illustrating an example of a storage device 400 storing an identifier file, according to the embodiment of FIG. 2.

Referring to FIG. 4, the storage device 400 stores one or more identifier files 410, one or more contents 430, and metadata 420 for each of the one or more contents 430. The metadata includes a storage device identifier and a host identifier, and may be used in an identifier file restoring procedure that will be described later.

Figure 5B:
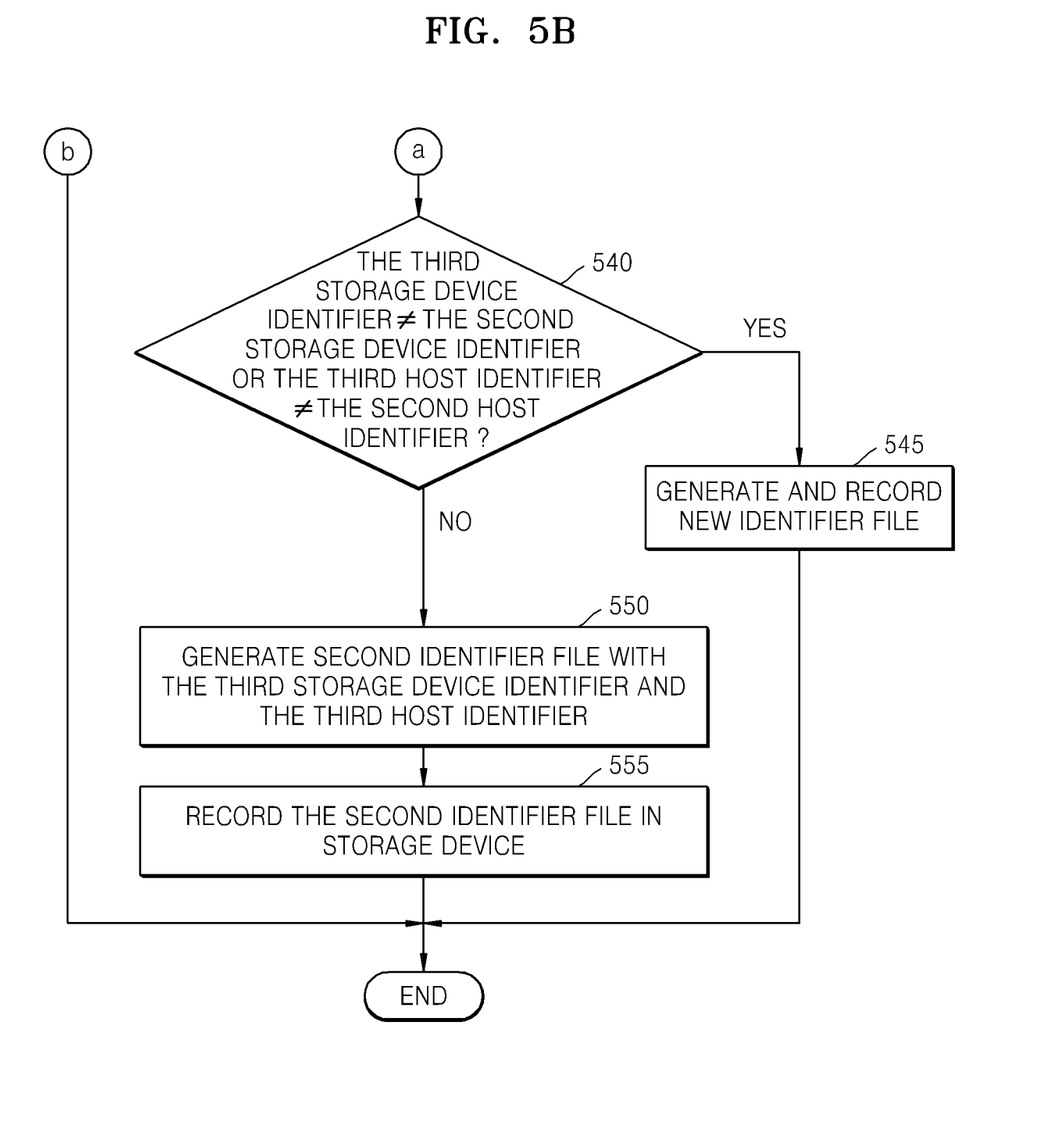

FIGS. 5A and 5B are flowcharts illustrating a method of restoring an identifier of a storage device as performed by a host according to another embodiment of the present invention. The method of restoring the identifier of the storage device is used so as to restore an identifier file when the identifier file stored in a general-use storage device is damaged or deleted due to a user's mistake or the like.

Referring to FIGS. 5A and 5B, in operation 505, the host scans an identifier file stored in the storage device and, in operation 510, determines whether the stored identifier file exists.

In operation 510, if the identifier file scanned in the storage device does not exist, the process proceeds to operation 530. However, if the identifier file scanned in the storage device exists, the process proceeds to operation 520.

In operation 520, the host compares a storage device identifier (a first storage device identifier) included in the identifier file with a storage device identifier (a second storage device identifier) stored in a non-volatile memory. Also, the host compares a host identifier (a first host identifier) of the host itself with a host identifier (a second host identifier) stored in the non-volatile memory. That is, the host compares whether each of the host identifier of the host itself and the storage device identifier of the storage device connected to the host itself are the same as each of the host identifier and the storage device identifier which are stored in the non-volatile memory. The reason for this comparison is to check whether the identifier file stored in the storage device is deleted or damaged.

In the case where the storage device stores a plurality of identifier files, the host scans all of the plurality of identifier files stored in the storage device and compares storage device identifiers and host identifiers which are stored in the plurality of identifier files with storage device identifiers and host identifiers which are stored in the non-volatile memory.

In operation 525, if each of the first storage device identifier and the first host identifier which are stored in the identifier file are respectively the same as each of the second storage device identifier and the second host identifier which are stored in the non-volatile memory, the host ends the process. That is, if the identifier file is already stored in the storage device and is not deleted or damaged, the procedure for restoring the identifier file is ended. On the other hand, if the storage device identifiers are different from each other or the host identifiers are different from each other, the process proceeds to operation 530.

In the case where content is stored in the host, the content may be stored together with a content encryption key or metadata. At this time, the storage device identifier may be included in the metadata.

Thus, in operation 530, the host scans the metadata of the content stored in the storage device.

In operation 535, the host compares the storage device identifier (a third storage device identifier) and a host identifier (a third host identifier) which are included in the metadata with the storage device identifier (the second storage device identifier) and the host identifier (the second host identifier) which are stored in the non-volatile memory. In the case where a plurality of pieces of metadata exists, operation 535 may be repeatedly performed on all of the plurality of pieces of metadata. Similarly, in the case where a plurality of identifiers is stored in the non-volatile memory, operation 535 may be repeatedly performed on all of the plurality of identifiers.

In operation 540, if each of the third storage device identifier and the third host identifier which are stored in the metadata are the same as each of the second storage device identifier and the second host identifier which are stored in the non-volatile memory, the process proceeds to operation 550. Otherwise, the process proceeds to operation 545.

In operation 545, in the case where the third storage device identifier is different from the second storage device identifier or the third host identifier is different from the second host identifier, the host generates and records a new identifier file in the storage device. A procedure for generating and recording the new identifier has been described with reference to FIG. 2, and thus, an additional description thereof will be omitted here.

Operation 550 corresponds to a case in which an identifier file is deleted or damaged but the identifier file can be restored from information included in the metadata. In operations 550 and 555, when the third storage device identifier is the same as the second storage device identifier and the third host identifier is the same as the second host identifier, the host restores the identifier file (a second identifier file) by using the third storage device identifier and the third host identifier.

Meanwhile, when there is a plurality of pieces of metadata which have identifiers that are the same as identifiers stored in the non-volatile memory, the host has to select one piece of metadata from among the plurality of pieces of metadata. In this case, the host may select metadata that is first scanned, metadata from an external input or metadata having the smallest or the biggest identifier value, thereby restoring the identifier file. The restoration of the identifier file may be achieved by generating the identifier file by using the identifiers included in the selected metadata, and by recording the generated identifier file in the storage device.

Figure 6:
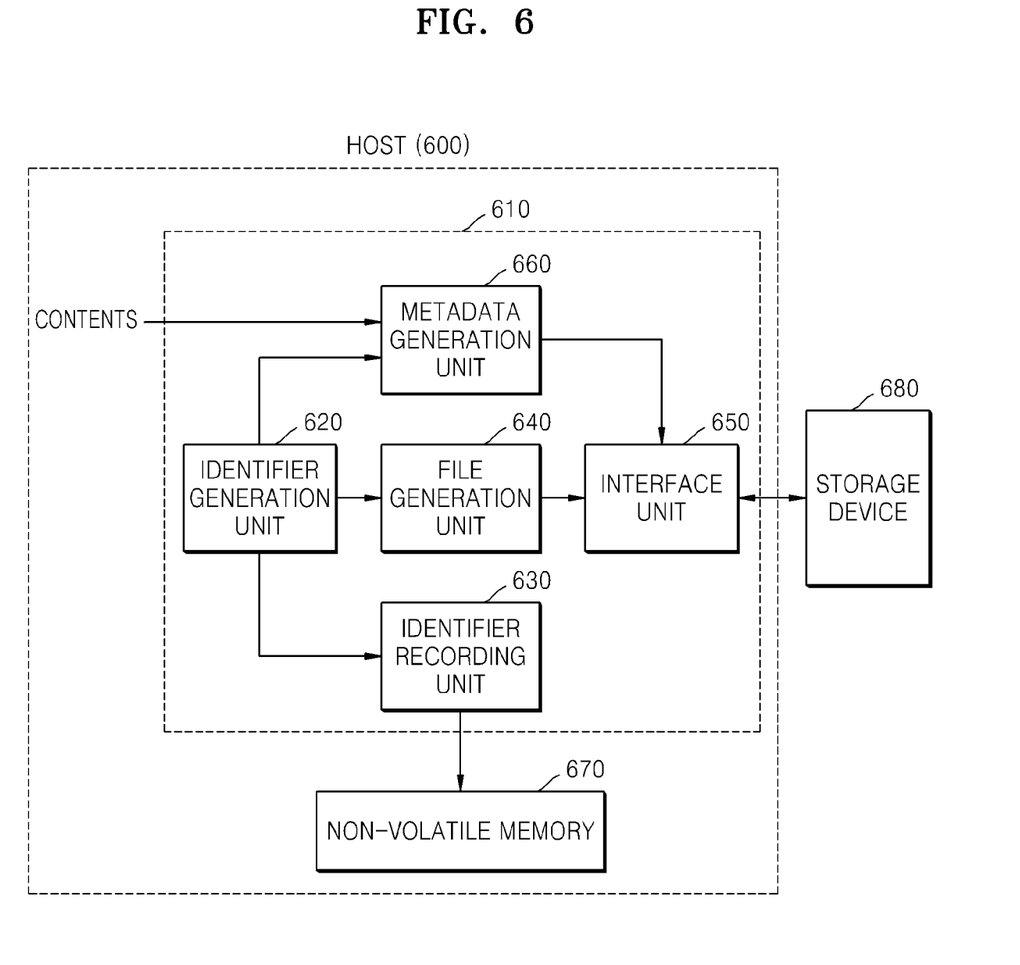
FIG. 6 is a block diagram illustrating an identifier management apparatus related to a storage device, according to an embodiment of the present invention.

FIG. 6 is a block diagram illustrating an identifier management apparatus 610 related to a storage device 680, according to an embodiment of the present invention.

Referring to FIG. 6, the identifier management apparatus 610 includes an identifier generation unit 620, an identifier recording unit 630, a file generation unit 640, an interface unit 650, and a metadata generation unit 660.

The identifier generation unit 620 generates a storage device identifier related to the storage device 680 connected to a host 600.

The identifier recording unit 630 records the storage device identifier, generated in the identifier generation unit 620, in a non-volatile memory 670.

The file generation unit 640 generates an identifier file which includes the storage device identifier generated in the identifier generation unit 620 and a host identifier previously stored in the file generation unit 640 or in the host 600. The host identifier and the identifier file are already described above, and thus, an additional description thereof will be omitted here. The file generation unit 640 may generate the identifier file to further include a verifier for performing an integrity check of the identifier file. The integrity check of the identifier file may be performed by using an electronic signature method, a MAC method, a hash function method, etc. A file name of the identifier file may be derived from the host identifier, as described above.

The interface unit 650 is used to record the identifier file, generated in the file generation unit 640, in the storage device 680.

The metadata generation unit 660 generates metadata related to contents input to or stored in the host 600. The metadata includes the storage device identifier and the host identifier, as described above. The contents and the metadata are recorded in the storage device 680 via the interface unit 650.

Also, in a modified embodiment, the identifier management apparatus 610 may generate a storage device identifier and record the generated storage device identifier and host identifier in the storage device 680.

Figure 7:
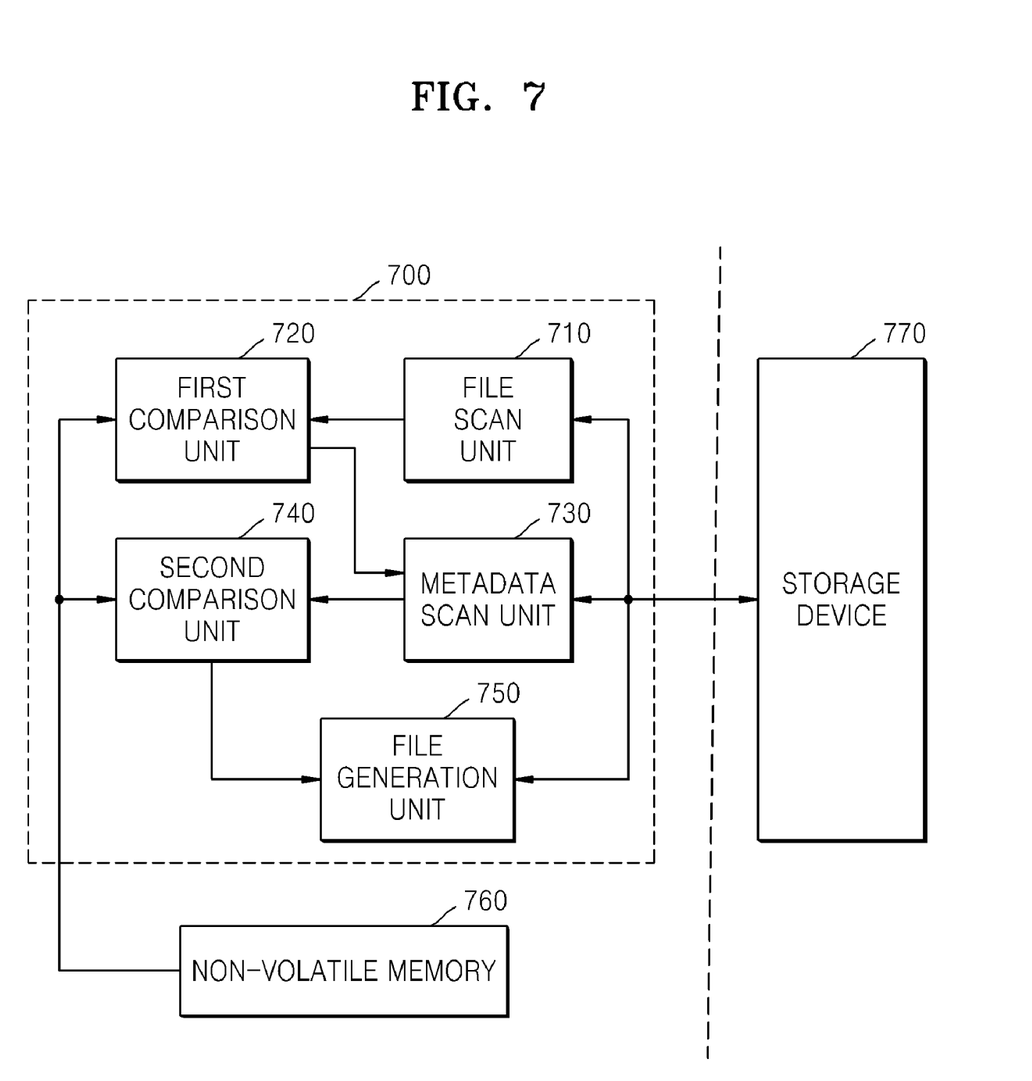
FIG. 7 is a block diagram illustrating an identifier restoration apparatus related to a storage device, according to an embodiment of the present invention.

FIG. 7 is a block diagram illustrating an identifier restoration apparatus 700 related to a storage device 770, according to an embodiment of the present invention.

Referring to FIG. 7, the identifier restoration apparatus 700 includes a file scan unit 710, a first comparison unit 720, a metadata scan unit 730, a second comparison unit 740, and a file generation unit 750.

The file scan unit 710 scans an identifier file (a first identifier file) stored in the storage device 770.

The first comparison unit 720 receives the first identifier file from the file scan unit 710, and compares a storage device identifier (a first storage device identifier) and a host identifier (a first host identifier) which are stored in the first identifier file with a storage device identifier (a second storage device identifier) and a host identifier (a second host identifier) which are stored in the non-volatile memory 760.

Based on a result of the comparison performed by the first comparison unit 720, the metadata scan unit 730 selectively scans metadata stored in the storage device 770.

The second comparison unit 740 compares a storage device identifier (a third storage device identifier) and a host identifier (a third host identifier) which are stored in the metadata with the second storage device identifier and the second host identifier which are stored in the non-volatile memory 760. When a plurality of pieces of metadata is stored in the storage device 770, the metadata scan unit 730 and the second comparison unit 740 scan and compare the plurality of pieces of metadata.

As a result of the comparison performed by the second comparison unit 740, the file generation unit 750 generates an identifier file (a second identifier file) by selectively using the metadata (the third storage device identifier and the third host identifier), and records the generated second identifier file in the storage device 770. A method of selecting one piece of metadata, from among the plurality of pieces of metadata, for restoration is described above, and thus, an additional description thereof will be omitted here.

According to the present invention, a host generates and records a virtual unique identifier in a storage device. By doing so, the present invention can use a reliable unique identifier related to a non-intelligent general-use storage device.

The embodiments of the method of managing the identifier of the storage device as performed by the host according to the present invention can be written as computer programs and can be implemented in general-use digital computers that execute the programs using a computer readable recording medium. The computer readable recording medium is any data storage device that can store programs or data which can be thereafter read by a computer system. Examples of the computer readable recording medium include ROM, Random Access Memory (RAM), CD-ROMs, magnetic tapes, hard disks, floppy disks, flash memory, optical data storage devices, and so on. The computer readable recording medium can also be distributed over network-coupled computer systems so that the computer-readable code is stored and executed in a distributed fashion.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of managing an identifier of a storage device, performed by a host, the method comprising:
   generating a storage device identifier;
   recording the storage device identifier in a non-volatile memory of the host which generates the storage device identifier;
   generating an identifier file comprising the storage device identifier and a host identifier of the host; and
   recording the identifier file in the storage device.

2. The method of claim 1, further comprising:
   generating metadata of contents input to or stored in the host; and
   recording the contents and the metadata in the storage device,
   wherein the metadata comprises the storage device identifier and the host identifier.

3. The method of claim 1, wherein the identifier file further comprises a verifier for performing an integrity check of the identifier file.

4. The method of claim 3, wherein the integrity check of the identifier file is performed using at least one of an electronic signature method, a Message Authentication Codes (MAC) method, and a hash function method.

5. The method of claim 1, wherein a file name of the identifier file is derived from the host identifier.

6. A method of managing an identifier of a storage device, performed by a host, the method comprising:
generating a storage device identifier; and
recording the generated storage device identifier and a host identifier of the host in the storage device, wherein the host generates the storage device identifier.

7. A method of restoring an identifier of a storage device, performed by a host, the method comprising:
scanning a first identifier file stored in the storage device;
performing a first comparison of a first storage device identifier and a first host identifier which are included in the first identifier file with a second storage device identifier and a second host identifier which are stored in a non-volatile memory of the host;
selectively scanning metadata related to contents stored in the storage device, based on a result of the first comparison;
performing a second comparison of a third storage device identifier and a third host identifier which are included in the metadata, with the second storage device identifier and the second host identifier;
generating a second identifier file by selectively using the third storage device identifier and the third host identifier, based on a result of the second comparison; and
recording the second identifier file in the storage device.

8. The method of claim 7, wherein the second comparison comprises comparing a fourth storage device identifier and a fourth host identifier which are included in another metadata stored in the storage device, with the second storage device identifier and the second host identifier, and
wherein the generating of the second identifier file comprises generating the second identifier file with one selected from the third storage device identifier and the fourth storage device identifier based on at least one of a scanning order, an external input, and a magnitude.

9. A storage device identifier management apparatus comprising:
an identifier generation unit which generates a storage device identifier;
an identifier recording unit which records the storage device identifier in a non-volatile memory of a host which generates the storage device identifier;
a file generation unit which generates an identifier file comprising the storage device identifier and a host identifier of the host; and
an interface unit which records the identifier file in the storage device.

10. The identifier management apparatus of claim 9, further comprising a metadata generation unit which generates metadata of contents input to or stored in the host, wherein the contents and the metadata are recorded in the storage device via the interface unit, and wherein the metadata comprises the storage device identifier and the host identifier.

11. The identifier management apparatus of claim 9, wherein the identifier file further comprises a verifier to perform an integrity check of the identifier file.

12. The identifier management apparatus of claim 11, wherein the integrity check of the identifier file is performed using at least one of an electronic signature method, a Message Authentication Codes (MAC) method, and a hash function method.

13. The identifier management apparatus of claim 9, wherein a file name of the identifier file is derived from the host identifier.

14. A storage device identifier management apparatus comprising:
an identifier generation unit which generates a storage device identifier; and
an interface unit which records the storage device identifier and a host identifier of a host in the storage device, wherein the host generates the storage device identifier.

15. A storage device identifier restoration apparatus comprising:
a file scan unit which scans a first identifier file stored in the storage device;
a first comparison unit which performs a first comparison of a first storage device identifier and a first host identifier which are included in the first identifier file, with a second storage device identifier and a second host identifier which are stored in a non-volatile memory of a host;
a metadata scan unit which selectively scans metadata related to contents stored in the storage device, based on a result of the first comparison;
a second comparison unit which performs a second comparison of a third storage device identifier and a third host identifier which are included in the metadata with the second storage device identifier and the second host identifier; and
a file generation unit generating a second identifier file by selectively using the third storage device identifier and the third host identifier, based on a result of the second comparison, and recording the second identifier file in the storage device.

16. The identifier restoration apparatus of claim 15, wherein the second comparison unit compares a fourth storage device identifier and a fourth host identifier which are included in another metadata stored in the storage device with the second storage device identifier and the second host identifier, and
wherein the file generation unit generates the second identifier file with one selected from the third storage device identifier and the fourth storage device identifier based on at least one of a scanning order, an external input, and a magnitude.

17. A computer readable recording medium having recorded thereon a program for executing a method of managing an identifier of a storage device, performed by a host, the method comprising:
generating a storage device identifier;
recording the storage device identifier in a non-volatile memory of the host which generates the storage device identifier;
generating an identifier file comprising the storage device identifier and a host identifier of the host; and
recording the identifier file in the storage device.

18. A computer readable recording medium having recorded thereon a program for executing a method of managing an identifier of a storage device, performed by a host, the method comprising:
generating a storage device identifier; and
recording the storage device identifier and a host identifier of the host in a storage device, wherein the host generates the storage device identifier.

19. A computer readable recording medium having recorded thereon a program for executing a method of restoring an identifier of a storage device, the method comprising:
scanning a first identifier file stored in the storage device;
performing a first comparison of a first storage device identifier and a first host identifier which are included in the first identifier file with a second storage device identifier and a second host identifier which are stored in a non-volatile memory of a host;

selectively scanning metadata related to contents stored in the storage device, based on a result of the first comparison;

performing a second comparison of a third storage device identifier and a third host identifier which are included in the metadata, with the second storage device identifier and the second host identifier;

generating a second identifier file by selectively using the third storage device identifier and the third host identifier, based on a result of the second comparison; and recording the second identifier file in the storage device.

* * * * *